Feb. 14, 1956   F. A. GOSS, JR   2,734,975
ELECTRICAL CONTROL
Filed Jan. 31, 1951   4 Sheets-Sheet 1
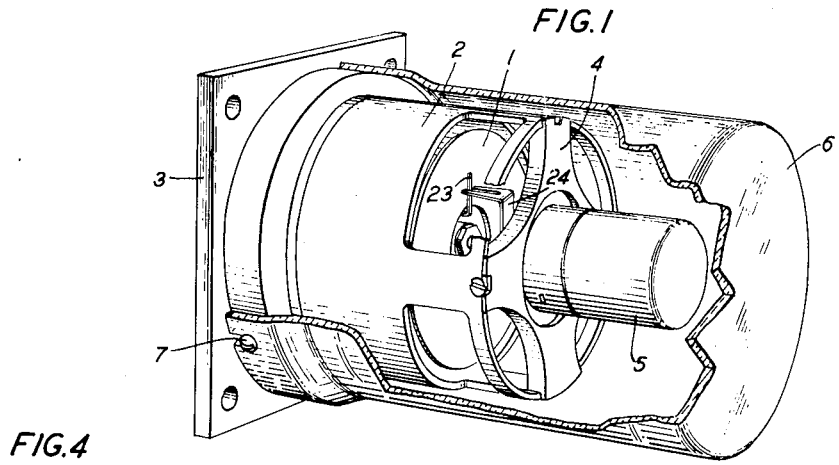
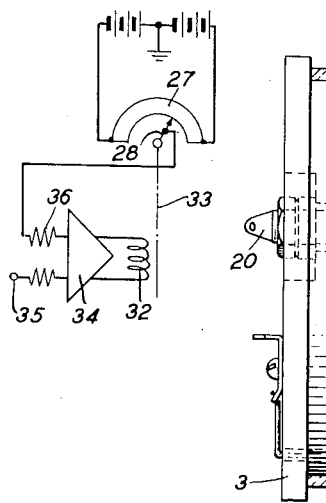
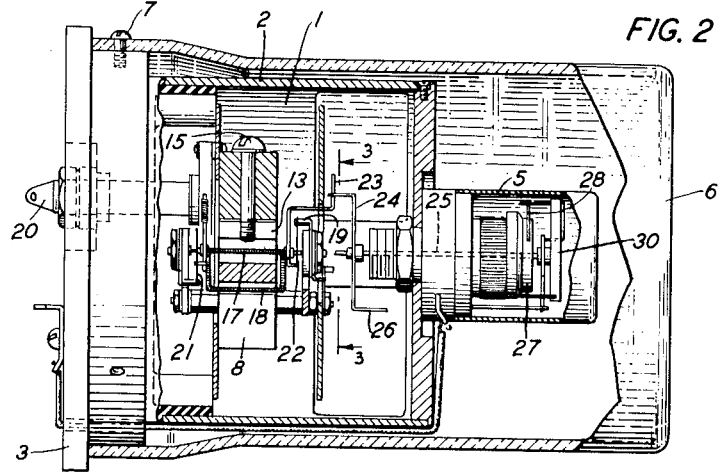
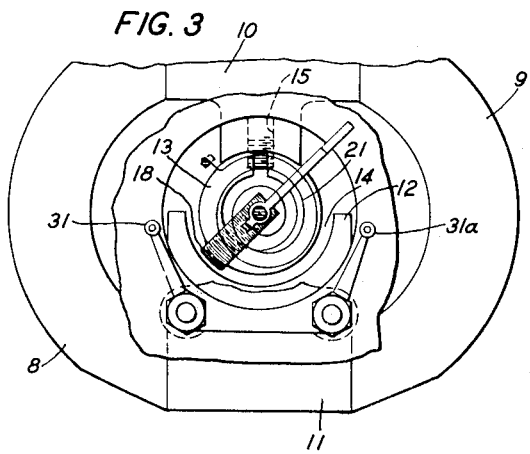
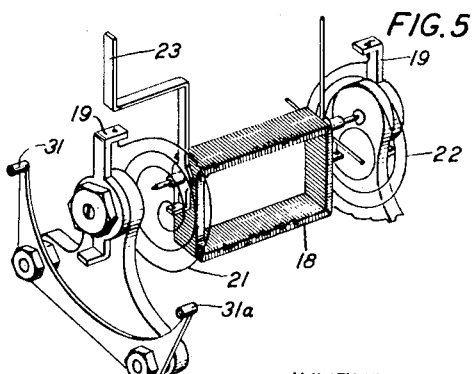
INVENTOR
F. A. GOSS, JR.
BY
J. F. McEneany
ATTORNEY INVENTOR
F. A. GOSS, JR.
BY
J. F. McEneany
ATTORNEY Feb. 14, 1956  F. A. GOSS, JR  2,734,975
ELECTRICAL CONTROL
Filed Jan. 31, 1951  4 Sheets-Sheet 3

INVENTOR
F. A. GOSS, JR.
BY
ATTORNEY

Feb. 14, 1956     F. A. GOSS, JR     2,734,975
ELECTRICAL CONTROL
Filed Jan. 31, 1951     4 Sheets-Sheet 4
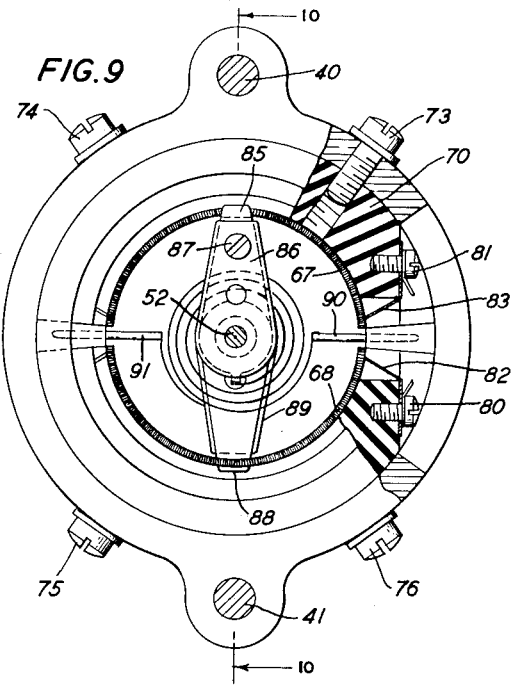
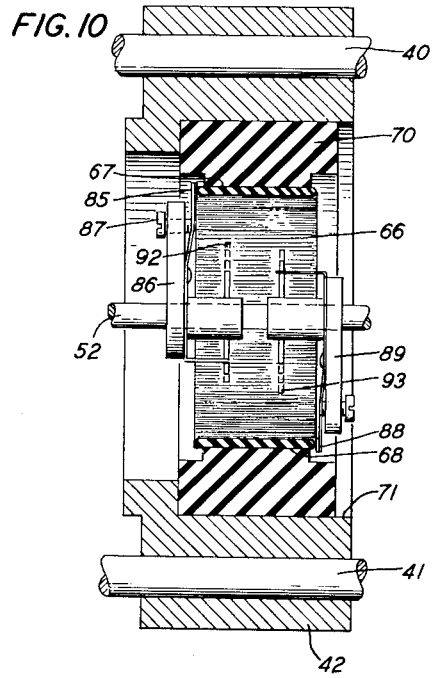
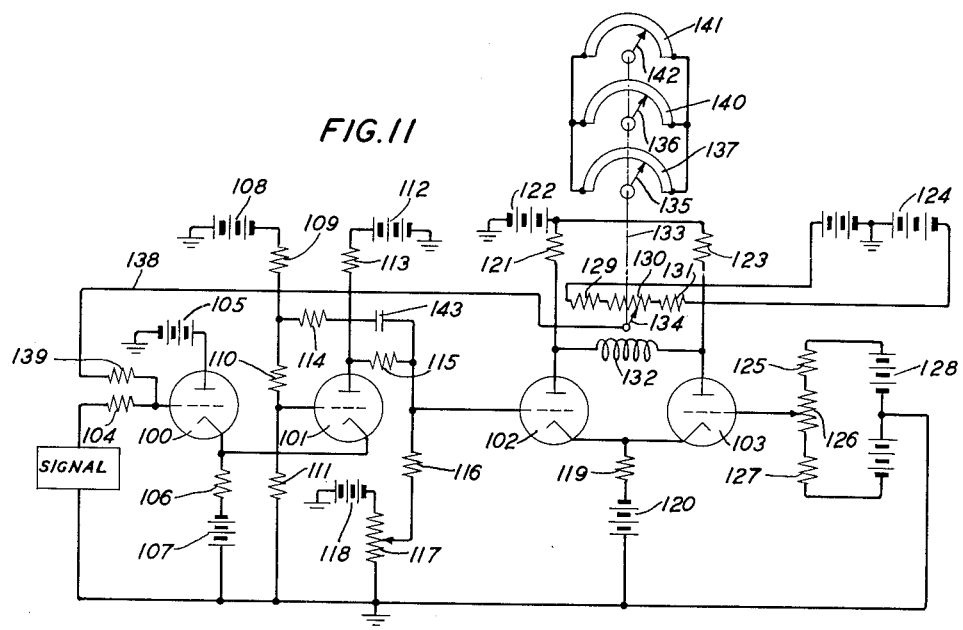
INVENTOR
F. A. GOSS, JR.
BY
ATTORNEY

United States Patent Office 2,734,975
Patented Feb. 14, 1956

2,734,975

ELECTRICAL CONTROL

Frank A. Goss, Jr., Morris Plains, N. J., assignor to Bell Telephone Laboratories, Incorporated, New York, N. Y., a corporation of New York Application January 31, 1951, Serial No. 208,726

4 Claims. (Cl. 201—48)

This invention relates to position control systems and particularly to improvements in such systems employed to control the position of the value varying element of one or more electrical circuit components in response to signal impulses from a remotely located signal source.

It is the object of this invention to provide a position control system incorporating relatively small component units in a compact assembly permitting its use in locations wherein weight and space are limiting factors.

It is a further object of this invention to provide a position control system incorporating a light-weight meter movement as the signal responsive motive means for the movable element of the controlled device and in which the movable element of the meter movement is directly coupled mechanically to the movable element of the controlled device.

A feature of the invention resides in the provision of a position control system including a light-weight meter movement as a motive means in which all forces tending to introduce inaccuracy of movement of the meter shaft in response to signal voltages are reduced to a negligible value and the motive means is included in an electrically controlled servo loop. Specifically, the shaft of the movable element of the meter is freed of all torques adversely affecting its free rotation and the meter movement is included in the output circuit of a summing amplifier, the input of which receives the signal voltage and a second voltage proportional to the movement of the meter shaft in response to the impressed signal voltage.

In one known type of electrical computer, the movable element of one or a plurality of potentiometers having shaped potentiometer cards is made responsive to a signal voltage obtained at a point remote from the computer. This signal voltage may be that obtained from a remotely situated potentiometer, the movable element of which is moved in accordance with vertical or horizontal motion of a moving object. In order to obtain at the computer, a voltage corresponding to the voltage impressed from the controlling unit, servomotor systems have frequently been used successfully. While adequate for general use, computer units employing servomotors are of such weight and size that the use in locations where weight and space are limiting factors, such as airborne computers, presents many problems.

Applicant conceived the idea that the conventional servomotor unit might be replaced by a light-weight meter movement which, in combination with and directly coupled to the shaft of a miniature potentiometer, could be made into a compact and highly accurate position control unit for the purpose desired. Several problems were encountered in the adaptation of this idea to practical use, all of which have been solved in a novel manner in accordance with this invention, as will be described hereinbelow.

Applicant has selected a suspended coil type meter or galvanometer of which the d'Arsonval type is the most familiar example. In this type meter, the rotating meter shaft is attached to a coil suspended in a magnetic air-gap. This type meter is highly sensitive and is readily responsive to the magnitude of the voltages obtained from the voltage source used in computer systems. It was found, however, that the rotation of the meter shaft in response to the signal voltage was not uniformly accurate over the entire range of movement of the meter shaft.

In meter movements of the type described, electrical impulses are normally carried to the suspended coil through coiled wire connections which also act as restoring springs for the rotating meter shaft. The restoring force of these spring connections is not uniform for every position of the meter shaft, the force being relatively small during initial movement of the meter shaft and becoming larger as the shaft rotates to its upper limit of movement. Potentiometers employed in some computer units are connected in series across a voltage source having the mid-point grounded so that movement of the brush in one direction from center will introduce into the computer potentials above ground potential while movement in the opposite direction will introduce potentials below ground potential. Obviously, non-uniform opposing forces on the shaft of the motive means would destroy the accuracy and, therefore, the usefulness of the positioning control system for the purpose desired.

In the normal use of a meter movement, the indicating needle is the only mass mounted on the meter shaft, thus providing an extremely light load for the meter movement which responds to an electrical quantity to be measured. While such a meter movement might possibly be used as the motive means for a single brush of a miniature potentiometer with proper adjustment of the restoring spring of the meter movement to permit linear movement of the brush over its range, the same meter movement restoring spring would require a different adjustment for each additional potentiometer unit added to the meter movement shaft. The position control unit developed by applicant will be used in computers in which it is essential that the position of a plurality of potentiometer brushes be simultaneously controlled. By applicant's novel arrangement, one or more potentiometer units may be added on the single shaft of the meter movement as needed without adjustment of any component part of the unit for each addition. By reason of the arrangement of the meter movement in the output of an amplifier included in an electrically controlled servo loop, sufficient power is made available to insure rapid and uniform rotation of the meter movement shaft even though the shaft may support a considerable number of potentiometer units.

In accordance with this invention the meter movement employed as the motive means is directly coupled mechanically to the controlled potentiometer shaft; the meter shaft is freed of opposing torques by the replacement of the restoring springs with coiled wire electrical connections which exert negligible torque on the meter shaft and the meter movement is placed in an electrically controlled servo loop including a summing amplifier, the input of which receives the signal voltage and a voltage from the controlled potentiometer. When the movable element of the controlled potentiometer is in its correct position for the signal voltage from the remote source, the voltage from the potentiometer which is fed back to the amplifier input is substantially equal in magnitude and of opposite polarity to the signal voltage, under which condition the motive means and the controlled potentiometer are maintained in the correct position for that signal voltage. In a further refinement of the position control system developed in accordance with this invention, the electrical connections from the source to the meter movement are coiled in opposite directions so that any slight rotational force which might possibly be impressed on the meter shaft by the electrical connections for every position of the shaft on one side of its mid-position is equal to the rotational force impressed on this shaft in every similar position thereof on the other side of its mid-position.

This invention will be more readily understood by reference to the accompanying drawings in which:

Fig. 1 is a perspective of one form of unit in accordance with the invention, showing the housing for a meter movement and the controlled potentiometer;

Fig. 2 is an elevation in section of the unit shown in Fig. 1;

Fig. 3 is a section taken through line 3—3 of Fig. 2;

Fig. 4 is a circuit diagram of the electrically controlled servo loop including a summing amplifier, the meter movement and the controlled potentiometer;

Fig. 5 is an enlarged exploded perspective of the mounting for the movable coil of the meter movement;

Fig. 9 is a section taken through line 9—9 of Fig. 6;

Fig. 10 is a section taken through line 10—10 of Fig. 9; and

Fig. 11 is a schematic disclosing a summing amplifier and the manner in which the meter movement is connected in the output thereof.

Figure 6:
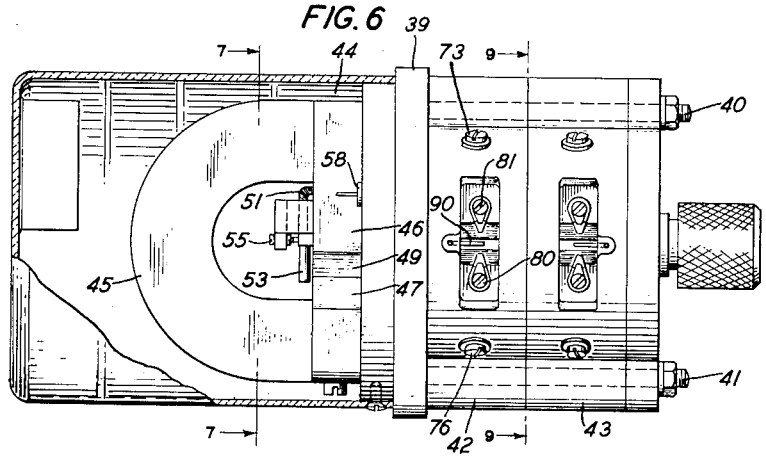
Fig. 6 is an elevation of a practical commercial form of control unit in accordance with the invention.
Figure 7:
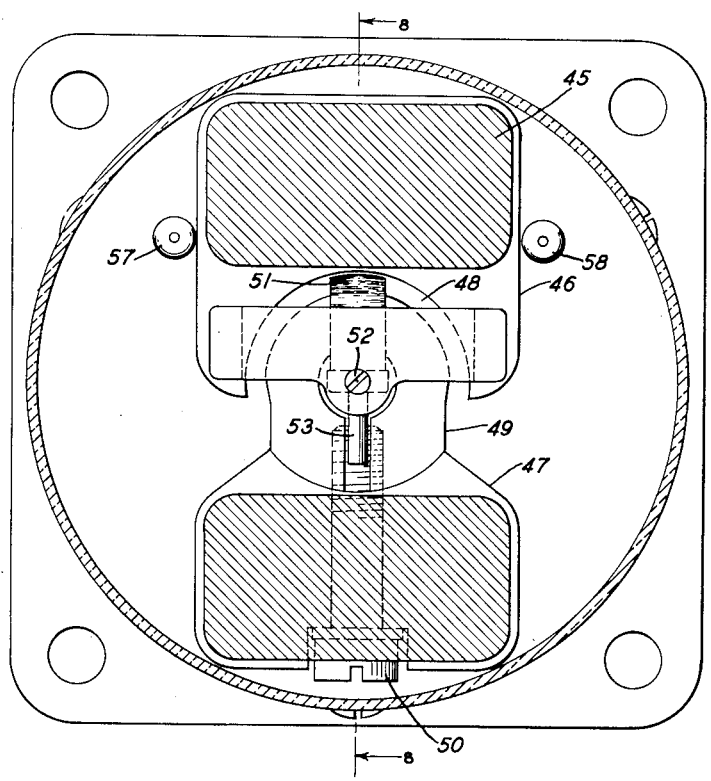
Fig. 7 is a section taken through line 7—7 of Fig. 6.

Referring to Fig. 1, a meter movement 1 is mounted in a housing 2, provided with a base 3. The housing 2 has attached thereto a spider 4 to which is secured a potentiometer 5. A transparent cover 6 is attached to base 3 by means of machine screws indicated at 7.

Referring particularly to Figs. 2, 3 and 4, the meter movement comprises two horseshoe-type permanent magnets 8 and 9 (Fig. 3) with inwardly extending pole-pieces 10 and 11. These pole-pieces are provided with pole faces 12 and 13 forming an arcuate air-gap 14. As shown in Fig. 2, the pole face 13, which is secured to the pole-piece 10 by means of machine screw 15, is centrally bored at 16 to provide space for a meter shaft 17. A wound wire coil 18, mounted on shaft 17, extends into the air-gap 14 and the movement of this coil in the air-gap in response to applied signals produces rotation of shaft 17.

Each end of shaft 17 is mounted in a pivot bearing to permit free rotation thereof. The source of signal voltage may be electrically connected to the coil 18 through the terminal indicated at 20. At each end of the coil assembly there is provided a coiled wire connection indicated at 21 and 22 (Fig. 5) through which the electrical connection is made from the terminal 20 to the coil 18.

An arm 23 is secured to shaft 17 to be rotated thereby. The free end of arm 23 is engaged by the bifurcated end of an arm 24, which is secured to shaft 25 of potentiometer 5. An upturned end 26 of arm 24 provides a counterbalance for the oppositely extending bifurcated end thereof.

The potentiometer 5 comprises a winding 27 and a brush 28. The brush 28 contacts the winding 27 and is moved over the surface thereof by the rotating shaft 25. Electrical connection to the brush 28 is made through a coiled wire indicated at 30.

The coil 18 is movable in the air-gap 14 over an arc of approximately 180 degrees, its movement being limited at each end of the swing by means of stops 31 and 31A which engage arm 23 at the limits of its swing.

Referring to Fig. 5, the coiled wire electrical connections 21 and 22 are made of soft metal of a diameter less than the diameter of a human hair so that they exert substantially zero torque on the shaft 17. As shown in Fig. 5, the wires 21 and 22 are coiled in opposite directions. By means of this arrangement, any slight rotational force on shaft 17 which might be introduced by wires 21 and 22 is made effective on the shaft in a manner such that it is the same for a position of the shaft on one side of its mid-position as it is for the same position of the shaft on the other side of its mid-position. Thus, rotational forces which might be introduced by wires 21 and 22 to adversely effect free movement of shaft 17 are minimized by oppositely coiling these connecting wires. It will been, therefore, that the coil shaft 17 is mounted in substantially frictionless pivot bearings and is, from a practical standpoint, freed from all possible torques opposing its rotation in the air-gap 14 in response to movement of the coil 18 in the air-gap. The shaft 17 is, therefore, completely free to follow movement of coil 18 in response to an applied signal voltage. The outer coil of each wire is permanently anchored to element 19. By slight rotation of the elements 19 the turning force of the wires may be equalized.

In Fig. 4 the coil 32 and element 33 controlled thereby represent the meter movement shown in Figs. 1 and 2. The meter movement is connected in the output of a summing amplifier 34 which receives signal voltages at terminal 35 and a voltage fed through a resistance 36 from the brush 28 in contact with the winding 27 of potentiometer 5. Additional potentiometers may be mounted on the driven shaft 25 in order to introduce voltages into a computer unit as desired. A more detailed description of the summing amplifier circuit and the entire electrically controlled servo loop, including this amplifier, will be given in connection with the description of Fig. 11.

In Figs. 6, 7, 8, 9 and 10, applicant discloses an integrated form of the combined meter movement and potentiometer unit wherein a plurality of potentiometers are mounted on a single shaft rotated by the meter movement. Referring to Fig. 6, a base member 39 has secured thereto, by means of studs 40 and 41, a plurality of double potentiometer units 42 and 43. On the opposite side of base 39 there is mounted a meter movement 44 including a horseshoe-type permanent magnet 45. The details of the magnetic structure of the meter movement may be seen by reference to Fig. 7, wherein the permanent magnet 45 is shown in section with pole-pieces 46 and 47 extending therefrom to form an arcuate air-gap 48. The actual pole face of pole-piece 47 is formed by centrally bored element 49 which is clamped into correct position by means of machine screw 50 extending through the pole-piece 47. A wound coil 51, mounted in and rotatable with shaft 52, has one leg thereof placed in the air-gap 48. The weight of the coil 51 to one side of shaft 52 is counterbalanced by extensions 53 and 54.

Figure 8:
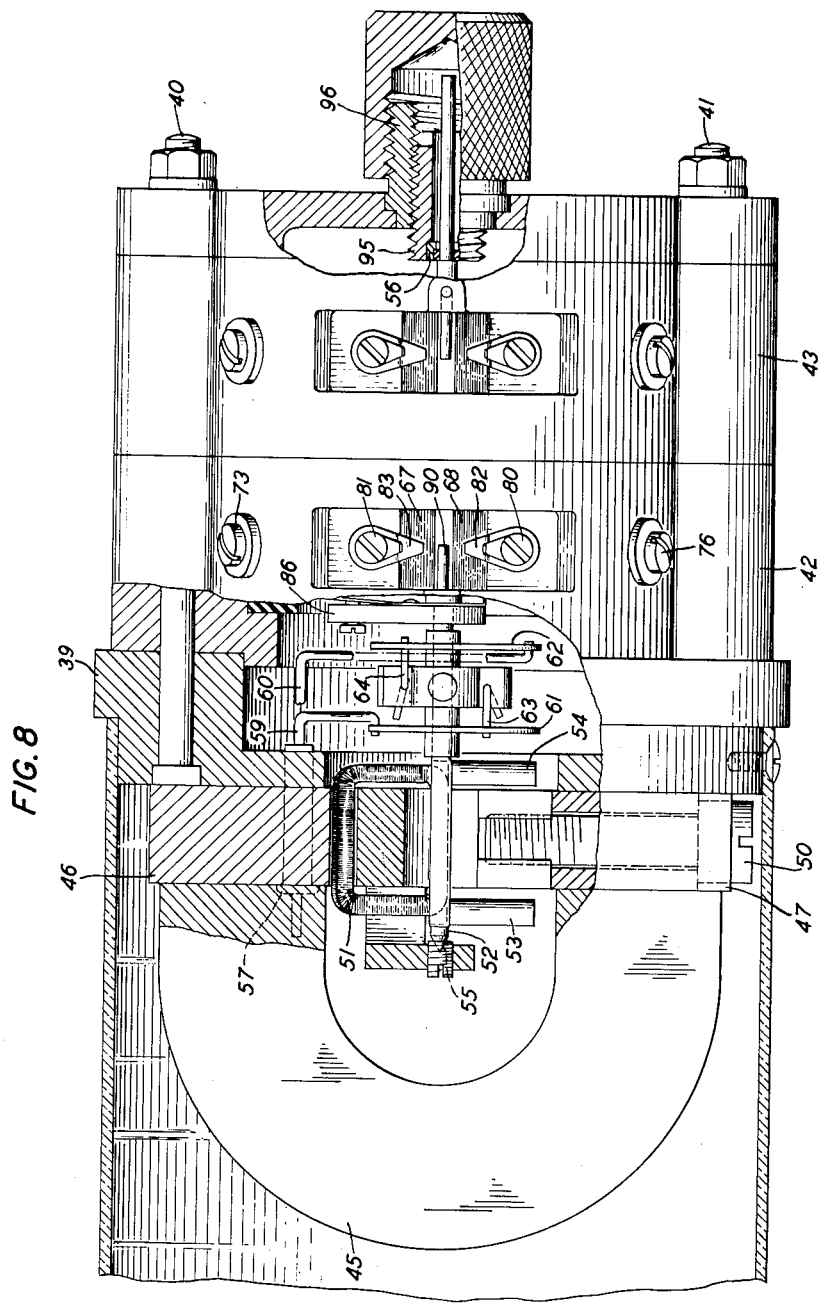
Fig. 8 is a section taken through line 8—8 of Fig. 7.

As will be seen, particularly by reference to Fig. 8, dynamic and static frictional loads on shaft 52 are made as low as possible by the use of a single shaft for mounting the meter coil and the brush elements of a plurality of potentiometers, the shaft having a pivot bearing at 55 and a second bearing at its opposite end, as indicated at 56. This use of a single shaft with but two bearings reduces the frictional resistance of the rotating unit to a negligible value.

Signal voltages from the output of the summing amplifier 34 (Fig. 4) are electrically connected to coil 51 at terminals 57 and 58. Electrical connections are made from the terminals through wires 59 and 60 to the outer coil of coiled wires 61 and 62, respectively. The inner end of coil 61 is connected to one end of the meter movement coil by means of wire 63 and the other end of meter coil 51 is connected from coil 62 by means of wire 64. The coiled wire 61 is found around shaft 52 in a direction opposite to wire 62 in a manner similar to that described in connection with the wires 21 and 22 of Fig. 5.

In Figs. 9 and 10 applicant discloses the details of one of the potentiometer units 42 and 43. From these figures it will be seen that applicant has provided a novel means for mounting and rotatably adjusting the potentiometer windings around the shaft 52 to insure that the brushes contact the windings from one end to the other in their travel between the limit set by the meter movement.

Referring now to Figs. 9 and 10, it will be seen that the potentiometer winding comprises a cylindrical member 66. Two electrically separate potentiometers are wound thereon and designated as potentiometer winding 67 and potentiometer winding 68. The cylindrical member 66 is mounted in and maintained concentric with shaft 52 by an accurately machined annular insulator 70 which fits into the accurately machined recess 71 in member 42. This mounting insures that the member 66 is accurately centered with respect to the shaft 52 so that the brushes each maintain accurate contact with the associated potentiometer winding throughout their movement over the winding.

The annular member 70 is clamped in member 42 by means of four machine screws 73, 74, 75 and 76 (Fig. 10).

Electrical connections from a source of power are made to the potentiometer windings 67 and 68 through terminals 80 and 81 and adjustable brushes 82 and 83, associated with these terminals. A similar set of terminals and brushes (not shown) are mounted on the opposite side of member 70. With terminal 80 loosened, the brush 82 may be moved over a range of several degrees to adjust its point of contact with winding 68, at which point it may be anchored by tightening terminal 80 in member 70. Similarly, brush 83 may be adjusted with respect to winding 68. These two brushes, together with the similar set, not shown, provide means to accurately align the electrical limits of each of the potentiometer windings 67 and 68 with the limits of movement of brushes 85 and 88 respectively.

A brush 85, in contact with winding 67, is secured to an arm 86 which in turn is secured to shaft 52. The pressure of the brush on the winding may be adjusted by a screw 87. A similar brush 88 contacts winding 68 and is mounted on an arm 89, secured to shaft 52. Electrical connections from brushes 85 and 88 are made through contacts 90 and 91 respectively. Contact 90 is connected to the outer coil of a coiled wire 92. Contact 91 is connected to the outer coil of coiled wire 93. The inner coil of each of coiled wires 92 and 93 is connected to the brushes as shown in Fig. 10. It will be observed that the coiled wire 92 is coiled around shaft 52 in a clockwise direction while wire 93 is coiled in a counter-clockwise direction to equalize any possible rotational force likely to be introduced in shaft 52 by these wires. A set of potentiometers similar to those included in housing section 42 are included in housing 43. Additional units may be added as needed. As shown in Fig. 8, the bearing 56 is mounted in a centrally bored, externally threaded member 95 which is adjustable in an internally threaded member 96.

The circuit for the position control system in accordance with this invention is shown in Fig. 11. The summing amplifier 34 (Fig. 4) includes vacuum tubes 100, 101, 102 and 103. These vacuum tubes may conveniently be in the form of two twin-triodes. The signal voltage is supplied through a resistor 104 to the grid of tube 100. A grounded positive voltage source 105 is connected to the anode of tube 100 and the cathode is connected through resistor 106 to a negative grounded voltage source 107. The cathode of tube 100 is directly connected to the cathode of tube 101. Therefore, a voltage applied to the grid of tube 100 will cause the potential of the cathodes of both tubes to change with respect to ground. A grounded source of negative voltage 108 is connected through resistors 109, 110 and 111 to ground. The grid of tube 101 is connected to the junction of resistors 110 and 111, thus applying a biasing voltage to this grid. A positive grounded source of voltage 112 is connected through resistors 113 to the anode of tube 101. The anode of tube 101 is connected through resistor 114 to the junction of resistors 109 and 110 to supply the degenerative feedback to the grid of tube 101 to stabilize the operation of the amplifier stage 101. The anode of tube 101 is connected through resistors 115 and 116 to the brush of potentiometer 117. The winding of potentiometer 117 is connected across a negative voltage source 118 and the grid of tube 102 is connected to the junction of resistors 115 and 116. The biasing voltage applied to the grid of tube 102 may, therefore, be altered by an adjustment of the brush of potentiometer 117. The cathodes of tubes 102 and 103 are connected together through the cathode coupling resistor 119 to a grounded negative voltage source 120. The anode of tube 102 is connected through resistor 121 to a grounded positive voltage supply 122. Similarly, the anode of tube 103 is connected through resistance 123 to the grounded positive voltage supply 122. Resistor 125, the winding of potentiometer 126 and resistor 127 are connected in series across a voltage supply 128 having its midpoint grounded. The brush of potentiometer 126 is connected to the grid of tube 103. Resistor 129, the winding of potentiometer 130 and resistor 131 are connected in series across the voltage supply 124. This supply is shown as having its mid-point grounded. The requirement is that this supply match in magnitude and have the opposite polarity of the signal voltage. A motor winding 132 (coil 18 of Fig. 2 or coil 51 of Fig. 8) is connected from the anode of tube 102 to the anode of tube 103. The motor shaft 133 (corresponding to shaft 17 of Fig. 2 or 52 of Fig. 9) has mounted thereon a plurality of potentiometer brushes 134, 135 and 136. Brushes 134 and 135 correspond to brushes 85 and 88 of Figs. 9 and 10 and potentiometer windings 130 and 137 correspond to windings 67 and 68 of Fig. 10. The brush 134 is connected through wire 138 and resistor 139 to the grid of tube 100. The potentiometer windings 137, 140 and 141 may be connected as desired to computer voltages and the output functions may be utilized by means of electrical connections to the brushes 135, 136 and 142 of potentiometers 137, 140 and 141, respectively.

The circuit is balanced when equal voltages of opposite polarity are connected through resistors 104 and 139 to the grid of tube 100. This situation will exist normally when the brush 134 and, therefore, the brushes of the other potentiometers are in correct position for the magnitude of the signal voltage supplied to the summing amplifier. If these voltages be unequal, a resultant, or error voltage will be supplied to the grid of tube 100, causing the anode current of this tube to change, which, in turn produces a change in the potential of the cathode of tube 101. This change in the potential of the cathode of tube 101 is amplified by this tube and supplied to the grid of tube 102. Tubes 102 and 103 are normally balanced, so that no current flows in the motor coil 132. Application of the amplified error voltage on the grid of tube 102 will change the anode current flowing in this tube, thus changing the potential of the anode with respect to ground and also changing the potential of the cathode with respect to ground. This difference in the potential of the anodes of tubes 102 and 103 will cause a current to flow in motor coil 132, which in turn will produce movement of the motor shaft of brush 134 in a direction to reduce the error voltage on the grid of tube 100, and by reason of applicant's provision of a freely rotatable shaft, this movement of the potentiometer brushes will continue until the error voltage is reduced substantially to zero, at which time the tubes 102 and 103 will be balanced. Capacitor 143 is connected across resistor 115 to stabilize the operation of the circuit.

It will be seen from the above specification that applicant has provided a compact, light-weight system for controlling the position of a plurality of potentiometer brushes in accordance with a signal voltage and has provided a system wherein these brushes readily follow the signal voltage to their correct position in response thereto and are maintained in correct position for the particular signal voltage applied.

What is claimed is:

1. A unit for use in a position control system comprising a housing, a single shaft rotatable in two bearings fixed in said housing, a looped current-carrying conductor mounted at one end of said shaft, a magnet system forming an air-gap in the path of movement of said conductor, a potentiometer having a circular winding mounted in said housing concentric with said shaft, said potentiometer having a brush secured to and rotatable by said shaft, a pair of electrical terminals mounted on said housing, an electrical connection between each of said terminals and said winding, each connection including a brush adjustable over a limited length of said winding at the opposite ends thereof whereby the electrical limits of said winding may be aligned with the limits of movement of said brush.

2. In combination in a control unit for a position control system, a base member, permanent magnet means mounted on one side of said base member and arranged to form an air-gap, a rotatable shaft extending through said base member at the center thereof, a bearing for one end of said shaft mounted on said base, an electrical conductor secured to said shaft and positioned for movement in the air-gap formed by said magnetic means in response to applied signal voltage, a plurality of studs extending from the other side of said base in parallel relation to said centrally disposed shaft and radially displaced therefrom, an end member mounted on said studs to be movable toward and away from said base member, said end member being provided with a bearing supporting said shaft intermediate its ends, a plurality of housings slidably mounted on said studs between said base and said end member, each of said housings including at least one potentiometer winding circularly disposed around said shaft, brushes secured to said shaft for rotation therewith, each of said brushes disposed to engage one of said plurality of potentiometers, and means on said studs for clamping said housings and said end member as a unit to said base.

3. A control unit in accordance with claim 2 in which terminals are provided on the exterior surfaces of said plurality of potentiometer housings, certain of said terminals being electrically connected to said brushes through wires coiled around said shaft and others of said terminals being connected to said windings through wires slidable over the surfaces of the potentiometer winding for a limited distance from the ends thereof.

4. In combination in a control unit for a position control system, a base member, a relatively long rotatable shaft extending through said base member, a bearing supporting one end of said shaft and mounted on said base member, permanent magnet means secured to said base member and forming an air-gap, an electrical conductor movable in said air-gap in response to signal voltages applied thereto, said conductor being attached to and producing rotation of said shaft, potentiometer brushes secured to said shaft, a plurality of studs extending from said base parallel to and substantially equal to the length of said shaft, a housing slidably mounted on said studs, said housing including therein at least one potentiometer winding circularly disposed about said shaft in contact with said brush, an end member movably mounted on said studs, means for clamping said housing and said end member against said base, said end member supporting therein a bearing which engages the periphery of and is adjustable along said shaft whereby one or a plurality of potentiometer housings may be secured to said base in operative relation to said rotating shaft.

References Cited in the file of this patent

UNITED STATES PATENTS

| 611,722 | Weston | Oct. 4, 1898 |
| 1,414,709 | Reisbach | May 2, 1922 |
| 2,151,793 | Patin | Mar. 28, 1939 |
| 2,270,991 | Bagno | Jan. 27, 1942 |
| 2,380,784 | Patin | July 31, 1945 |
| 2,419,952 | Konicek | May 6, 1947 |
| 2,458,829 | Bruce | Jan. 11, 1949 |
| 2,499,198 | Rich | Feb. 28, 1950 |
| 2,510,733 | Wolferz | June 6, 1950 |

OTHER REFERENCES

"Electrical Measurements," Laws, McGraw-Hill Book Co., 1938.

Ser. No. 308,425, Patin (A. P. C.), published May 18, 1943.